(12) United States Patent
Sidhu

(10) Patent No.: US 11,032,316 B1
(45) Date of Patent: Jun. 8, 2021

(54) USING MACHINE LEARNING TECHNIQUES TO DETECT IMPOSTER PAGES IN AN ONLINE SYSTEM

(71) Applicant: Facebook, Inc., Menlo Park, CA (US)

(72) Inventor: Ravneet Singh Sidhu, Mountain View, CA (US)

(73) Assignee: Facebook, Inc., Menlo Park, CA (US)

(*) Notice: Subject to any disclaimer, the term of this patent is extended or adjusted under 35 U.S.C. 154(b) by 259 days.

(21) Appl. No.: 16/215,657

(22) Filed: Dec. 11, 2018

(51) Int. Cl.
  *H04L 29/06* (2006.01)
  *G06K 9/62* (2006.01)
  *G06N 20/00* (2019.01)

(52) U.S. Cl.
  CPC ........ *H04L 63/1483* (2013.01); *G06K 9/6201* (2013.01); *G06N 20/00* (2019.01)

(58) Field of Classification Search
  None
  See application file for complete search history.

(56) References Cited

U.S. PATENT DOCUMENTS

| | | | | |
|---|---|---|---|---|
| 8,225,413 B1* | 7/2012 | De | ............ | G06F 21/6245 726/26 |
| 10,320,811 B1* | 6/2019 | Faham | ............ | G06Q 50/01 |
| 10,769,503 B1* | 9/2020 | Buhler | ............ | G06K 9/726 |
| 2013/0013553 A1* | 1/2013 | Stibel | ............ | G06Q 10/107 707/602 |
| 2013/0139236 A1* | 5/2013 | Rubinstein | ............ | H04L 63/1483 726/7 |
| 2016/0125424 A1* | 5/2016 | Zolli | ............ | G06Q 20/4016 705/30 |
| 2016/0350675 A1* | 12/2016 | Laks | ............ | G06N 20/20 |
| 2019/0124109 A1* | 4/2019 | Foster | ............ | G06F 40/174 |
| 2019/0332849 A1* | 10/2019 | Gupta | ............ | G06K 9/00275 |
| 2019/0387005 A1* | 12/2019 | Zawoad | ............ | H04L 63/1425 |
| 2020/0125729 A1* | 4/2020 | Priel | ............ | G06F 11/00 |

* cited by examiner

*Primary Examiner* — Taghi T Arani
*Assistant Examiner* — Joshua Raymond White
(74) *Attorney, Agent, or Firm* — Fenwick & West LLP

(57) ABSTRACT

An online system detects imposter pages based on machine learning techniques. The online system maintains a plurality of authenticated pages and a plurality of unauthenticated pages, each of which is associated with a name and an image. From the plurality of unauthenticated pages, the online system filters out one or more unauthenticated pages that are associated with names of authenticated pages to obtain a group of candidate pages. Further, the online system pairs each candidate page up with an authenticated page. The candidate page has a name and/or image similar to the authenticated page. The online system inputs the candidate page and the authenticated page into a trained model. The trained model outputs an imposter score indicating a likelihood that the candidate page is an imposter page. The online system takes actions on the candidate page based on the imposter score.

16 Claims, 5 Drawing Sheets

600

Retrieve authenticated pages, each authenticated page associated with a name and an image
610

Retrieve unauthenticated pages, each unauthenticated page associated with a name and an image
620

Identify one or more unauthenticated pages to be legitimate pages relating to one of the authenticated pages
630

Filter the identified unauthenticated pages out from the retrieved unauthenticated pages such that the unauthenticated pages remaining are candidate pages for analysis as possible imposter pages
640

Pair up each of the candidate pages with an authenticated page
650

Provide each pair to a trained model, the trained model configured to provide an imposter score indicating likelihood that the candidate page is an imposter page
660

Responsive to the imposter score of a candidate page being above an imposter score threshold, preventing the candidate page from being provided for display to users of the online system
670

FIG. 6

USING MACHINE LEARNING TECHNIQUES TO DETECT IMPOSTER PAGES IN AN ONLINE SYSTEM

BACKGROUND

This disclosure relates generally to online systems and, in particular, to using machine learning techniques to detect imposter pages that are requested by users to be presented by online systems Online systems, such as social networking systems, have become increasingly prevalent in digital content distribution and consumption. They allow users to more easily communicate with one another. Users of online systems can sometimes associate with other online system users, forming a web of connections. Additionally, users may share personal information and other stories with other users connected to them via an online system. Examples of information shared by online system users include videos, music, contact information, background information, job information, interests, photos, notes, and/or other member-specific data.

A user of the online system can post the personal information and other stories on a page created by the user. Other users of the online system may follow the page and receive information from in the page. For example, a celebrity or entity may create such a page to share information with their fans/followers. However, some pages are created by a person or entity who pretends to be someone else in order to deceive users of the online system. Such fraudulent pages result in dissatisfaction of users in the online system who were fooled into believing the fraudulent page was the celebrity's or business' actual official page. It is therefore important for the online system to detect these imposter pages and take action to protect its users. Yet, determination of which pages are imposters can be very challenging. And, online systems generally wish to avoid false positive fraud detection that might result in a legitimate page being removed by mistake.

SUMMARY

In various embodiments of the invention, an online system uses machine learning techniques to detect whether a page created by a user of the online system is an imposter page (e.g., a page pretending to be or mimicking another page to deceive or confuse users into believing it is the other page).

In one example, the online system maintains pages created by users for presentation by the online system. Each page is associated with some sort of a descriptive name or title for the page or entity/person represented by the page, and at least one image (e.g., a profile or cover photo, an image in one of the posts on the page, etc.). Some of the pages have been authenticated ("authenticated pages"), meaning the online system has verified that they are authentic pages (e.g., a page actually managed or controlled by the business or entity that the page claims to represent, such as an official business or celebrity/famous person page). But some of the pages have not been authenticated ("unauthenticated pages"). An unauthenticated page may be an imposter page that is intended to deceive online system users, e.g., by pretending that it is an authentic page of an individual or entity. For example, the unauthenticated page includes information similar to that of an authenticated page of the individual or entity.

However, not all unauthenticated pages having information similar to that of authenticated pages are intended for deceiving online system users. For example, an unauthenticated page having the name "Golden State Warriors Fans" probably is not intended to deceive online system users into thinking that it is a page of Golden State Warriors that is operated or controlled by the Golden State Warriors entity or its official representatives. The name instead informs online system users that it is a legitimate page for fans of Golden State Warriors to show their support for the team. In some embodiments, the online system applies an initial filter to filter out such unauthenticated pages that may have initially looked like possible fraudulent imposter pages, but were actually legitimate. For example, the initial filter removes unauthenticated pages having names legitimately associated with names of authenticated pages as fan pages or pages providing positive support to the entity managed the corresponding authenticated page.

The online system then obtains a group of candidate pages that includes the unauthenticated pages that are remaining after the initial filter step (pages not removed by the initial filter). The online system detects imposter pages from the candidate page.

The online system pairs up a candidate page with an authenticated page that has similar names and images. Because of the similar names and images, the candidate page may be intended for deceiving online system users that it is a page of the individual or entity associated with the authenticated page. The online system selects each authenticated page from a plurality of the authenticated pages to pair up with the candidate page by scoring the pages or using other techniques. For example, the online system determines a similarity score indicating similarity of the candidate page to each of the plurality of authenticated pages based on names and images of the candidate page and the authenticated page. The online system selects the authenticated page associated with the highest similarity score to pair up with the candidate page.

Further, the online system inputs the pair (the candidate page and the authenticated page) into a machine learning model. Receiving the pair, the machine learning model outputs an imposter score of the candidate page. The imposter score indicates a likelihood that the candidate page is an imposter page. When the imposter score is beyond an imposter score threshold, the online system determines that the unauthenticated page is an imposter page and prevents the unauthenticated page from being provided for display to users of the online system. The imposter score and the pair of the candidate page and the authenticated page can be used as feedback to further train the machine learning model.

BRIEF DESCRIPTION OF THE DRAWINGS

FIG. 6 is a flowchart illustrating a process of detecting imposter pages, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
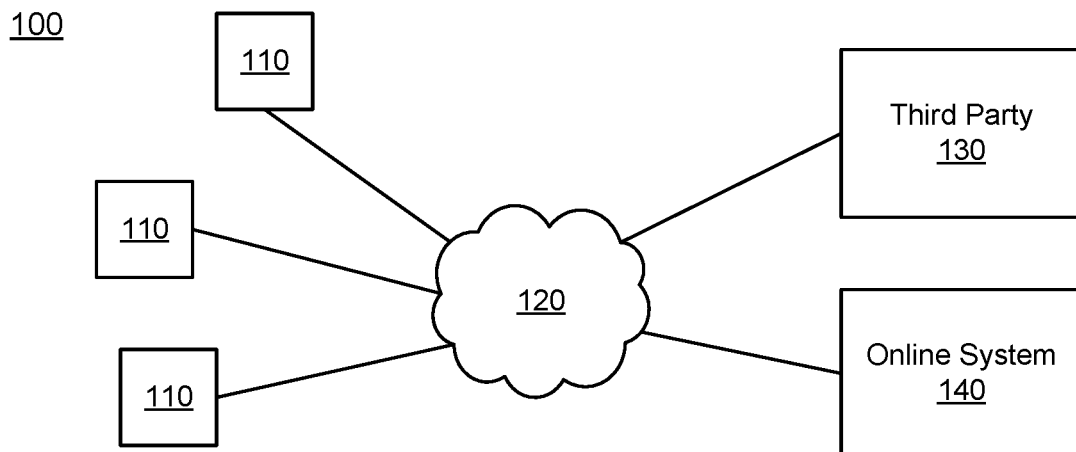
FIG. 1 is a block diagram of a system environment in which an online system operates, in accordance with an embodiment.

FIG. 1 is a block diagram of a system environment 100 in which an online system 140 operates, in accordance with an embodiment. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, through the client device 110, the user can create a page in the online system 140 to share information (e.g., images, videos, etc.) about the user with the user's connections. In one embodiment, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate with one or more third party systems 130 and the online system 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. For example, a third party system 130 may provide a page for presentation by the online system 140. A third party system 130 may also communicate information to the online system 140, such as advertisements, content, or information about an application provided by the third party system 130.

Figure 2:
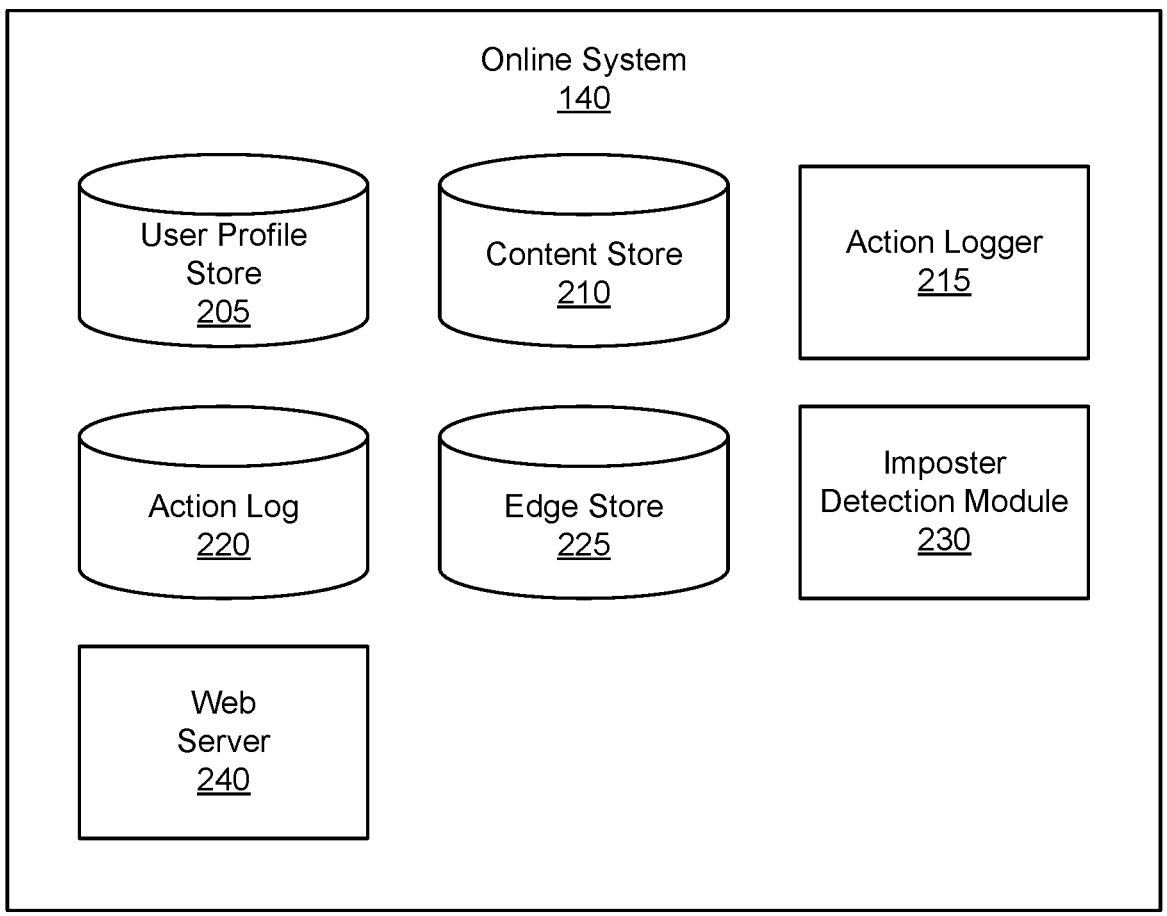
FIG. 2 is a block diagram of the online system in which an imposter detection module operates, in accordance with an embodiment.

FIG. 2 is a block diagram of the online system 140 in which a content distribution module 230 operates, in accordance with an embodiment. The online system 140 shown in FIG. 2 includes a user profile store 205, a content store 210, an action logger 215, an action log 220, an edge store 225, the imposter detection module 230, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220. A user profile may also include identification information of the user, including a user name, an email address, a physical address, a number, an image, or any combination thereof.

While user profiles in the user profile store 205 are frequently associated with individuals, allowing individuals to interact with each other via the online system 140, user profiles may also be stored for entities such as businesses or organizations. This allows an individual or entity to establish a presence on the online system 140 for connecting and exchanging content with other online system users. The individual or entity may post information about itself, about its products or provide other information to users of the online system 140 using a page associated with the user profile of the individual or entity. Information posted on a page can include names, images, videos, audios, text, and so on. Other users of the online system 140 may connect to the page to receive information posted to the page or to receive information from the page. A user profile associated with the page may include information about the individual or entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The content store 210 stores content items for presentation to a user. Content of a content item can be text, image, audio, video, or any other suitable data presented to a user. In various embodiments, the content of a content item also specifies a page of content. For example, a content item includes a landing page specifying a network address of a page of content to which a user is directed when the content item is accessed.

In some embodiments, a content item is associated with a bid amount. The bid amount is included in the content item by a user and is used to determine an expected value, such as monetary compensation, provided by an advertiser to the online system 140 if the content item is presented to a user, if the content item receives a user interaction when presented, or if any suitable condition is satisfied when the content item is presented to a user. For example, the bid amount included with a content item specifies a monetary amount that the online system 140 receives from a user who provided the content item to the online system 140 if the content item is displayed. In some embodiments, the expected value to the online system 140 of presenting the content item may be determined by multiplying the bid amount by a probability of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. The online system 140 logs interactions between users presented with the content item or with objects associated with the content item. Additionally, the online system 140 receives compensation from a user associated with a content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these user interactions is stored in the action log 220. Examples of user interactions with objects include: commenting on posts, sharing links, checking-in to physical locations via a client device 110, accessing content items, and any other suitable interactions. Additional examples of user interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were interacted, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The imposter detection module 230 detects imposter pages from pages stored in the user profile store 205. The user profile store 205 maintains pages, some of which have been authenticated ("authenticated pages") but some of which have not been authenticated ("unauthenticated pages"). Each page is associated with a name and an image. An unauthenticated page may be an imposter page, i.e., a page intended for deceiving viewers (online system users who view the page) into believing that it is an authentic page of an individual or entity. The imposter detection module 230 retrieves these pages from the user profile store 205. The imposter detection module 230 may apply an initial filter to remove unauthenticated pages that are not intended for deceiving users. In some embodiments, the imposter detection module 230 filters out legitimate unauthenticated pages, the name of each of which is legitimately associated with the name of an authenticated page. For example, the imposter detection module 230 filters out an unauthenticated page whose name includes the name of an authenticated page and the word "fan" or "fans." The unauthenticated pages that are not removed by the initial filter are included in a group of candidate pages, and the imposter detection module 230 determines whether each of these is an imposter page. In some embodiments, the imposter detection module 230 does not apply the initial filter and takes each unauthenticated page as a candidate page.

The imposter detection module 230 pairs each candidate page up with an authenticated page. For example, the imposter detection module 230 determines a similarity score that indicates similarity of the candidate page to each of a plurality of the authenticated pages based on names and images of the candidate page and the authenticated page. In one embodiment, the imposter detection module 230 determines a name similarity score that indicates similarity between pronunciation, spelling, etc. of the name of the candidate page and pronunciation, spelling, etc. of the name of the authenticated page. Additionally, the imposter detection module 230 determines an image similarity score that indicates similarity between the image of the candidate page and the image of the authenticated page, e.g., based on hash values of the images. The imposter detection module 230 determines the similarity score based on a combination of the name similarity score and the image similarity score. The imposter detection module 230 pairs the candidate page with an authenticated page for which the candidate page has a similarity score beyond a similarity threshold. Alternatively, the imposter detection module 230 ranks the similarity scores of the plurality of authenticated pages and selects the authenticated page of the highest similarity score to pair up with the candidate page.

Further, the imposter detection module 230 inputs the paired candidate page and authenticated page (or features extracted from these pages) into a machine learning model. The machine learning model outputs an imposter score indicating a likelihood that the candidate page is an imposter page. Responsive to the imposter score being beyond an imposter score threshold, the imposter detection module 230 prevents the candidate page from being provided for display to users of the online system. The imposter score, the candidate page, and the authenticated page can be fed back into the machine learning model to further train the machine learning model such that the model can learn from each new prediction made.

The imposter detection module 230 may also provide the candidate page for secondary review. For example, the imposter detection module 230 can send the candidate page to a client device 110 associated with a review user. The review user determines whether the candidate page is an imposter page and forwards the determination to the imposter detection module 230. Based on receiving a determination that the candidate page is an imposter page, the imposter detection module may block, suspend, or limit a user account associated with the candidate page as an imposter page. The module may also take down or remove the page from the online system, or send a warning to the entity managing the page. More details about the imposter detection module 230 are described in conjunction with FIG. 3.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as JOS®, ANDROID™, or BlackberryOS.

Personalized Content Delivery Based on Sentiment Responses

Figure 3:
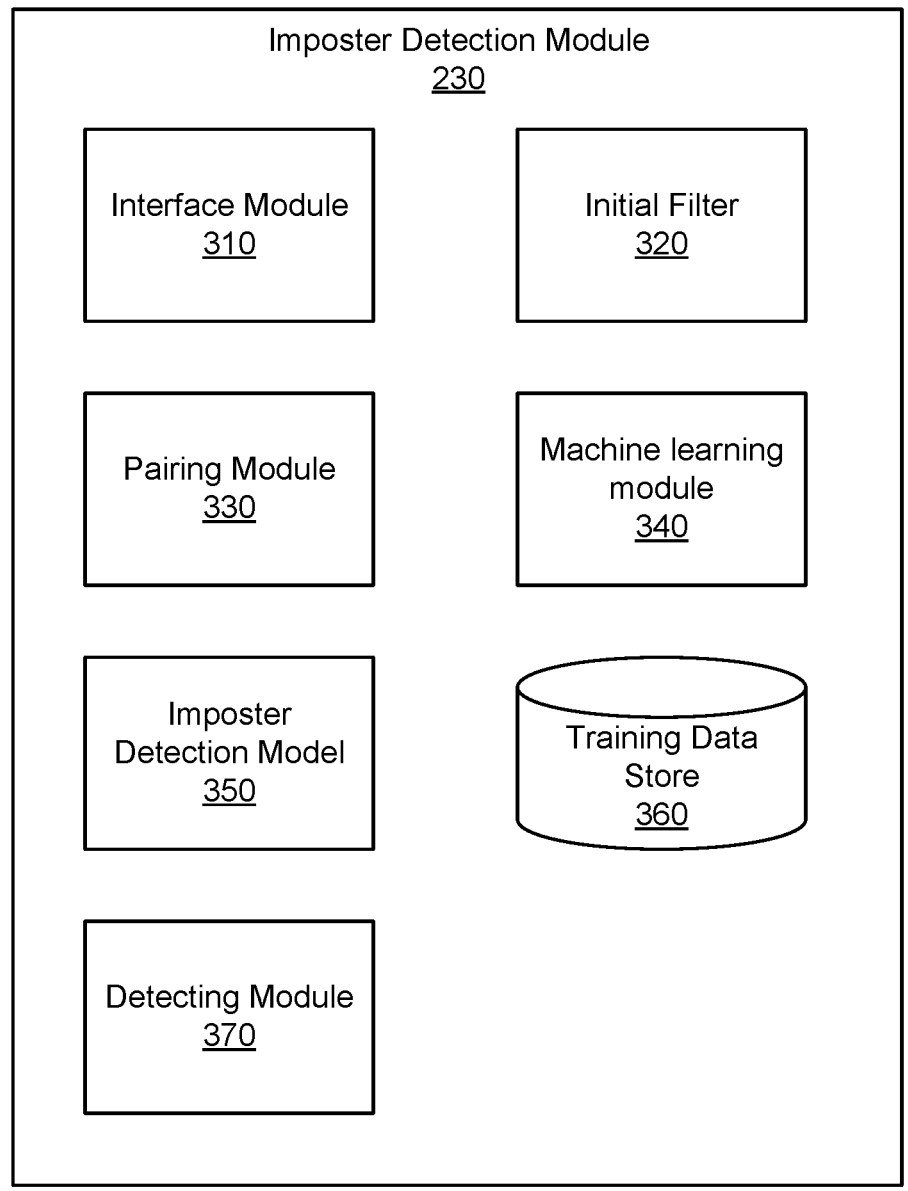
FIG. 3 is a block diagram of the imposter detection module, in accordance with an embodiment.

FIG. 3 is a block diagram of the imposter detection module 230, in accordance with an embodiment. As discussed above, the imposter detection module 230 detects whether an unauthenticated page is an imposter page based on its name or title of the page and/or based on at least one image associated with the page, such as a profile photo. The module can also use other factors that can be detected on the page, such as posts on the page, likes of the page, shares of the page, comments in response to posts on the page, images in posts on the page or in comments, event listings on the page, advertisements presented on the page, and other information. The imposter detection module 230 in the embodiment of FIG. 3 includes an interface module 310, an initial filter 320, a pairing module 330, a machine learning module 340, an imposter detection model 350, a training data store 360, and a detecting module 370. In other embodiments, the content distribution module 230 may include additional, fewer, or different components for various applications.

The interface module 310 facilitates communication of the imposter detection module 230 with other entities. For example, the interface module 310 retrieves authenticated pages and unauthenticated pages from the user profile store 205. As another example, the interface module forwards unauthenticated pages having an imposter score beyond or above an imposter score threshold to another entity for secondary review.

The initial filter 320 removes unauthenticated pages having names legitimately associated with names of authenticated pages to obtain a group of candidate pages. A name of an authenticated page can be a name of an entity, a name of a celebrity, a brand name, and so on. A name legitimately associated with an authenticated name may include the name of the authenticated page followed by the word "fan" or "fans." For instance, the name of an authenticated page might be "Golden State Warriors." "Golden State Warriors Fans" might also be a name legitimately associated with "Golden State Warriors." A name legitimately associated with an authenticated may include the words "fan of" or "fans of" followed by the name of the authenticated page. For instance, "Fans of Golden State Warriors" is legitimately associated with "Golden State Warriors." Similarly, other terms could be used for legitimate fan or follower pages, or other pages that are generally supporting or have a positive relationship with the entity behind the corresponding authenticated page. Another example would be a legitimate service provider for the Golden State Warriors that mentions this name in their page. An unauthenticated page that is not removed by the initial filter 320 is a possible imposter page, and hence is considered a candidate page for further imposter analysis.

The pairing module 330 selects an authenticated page to pair up with each candidate page up based on their names and images. In other words, the Golden State Warriors official page might be paired with at least one other potential imposter page that might be suggesting it is the official page. In some embodiments, the pairing module 330 determines a similarity score that scores the similarity of a candidate page to each of one or more authenticated pages. The similarity score indicates similarity of the name and/or image of candidate page to the name and/or image of the authenticated page. The pairing module 330 ranks the one or more authenticated pages based on their similarity scores and selects the authenticated page with the highest similarity score to pair up with the candidate page.

To determine a similarity score, in some embodiments, the pairing module 330 determines a name similarity score that indicates similarity between the name of the candidate page and the name of the authenticated page. The name similarity score can be determined based on pronunciation of the name of the candidate page and the name of the authenticated page. For example, the pairing module 330 compares pronunciation between the name of the candidate page and the name of the authenticated page using a phonetic algorithm. The phonetic algorithm generates a hash value for the candidate page and for each of the one or more authenticated pages. The pairing module 330 compares the hash values to determine the name similarity score. An example of the phonetic algorithm is Soundex. Alternatively or additionally, the name similarity score can be determined based on the text of the name of the candidate page and the name of the authenticated page. For example, the pairing module 330 conducts a word-to-word comparison and determines similarity of the name of the candidate page to the name of the authenticated page. The module can consider one or more of phonetics, spelling and common misspellings, nicknames or short names for words, common spam replacement words, roots of words, suffixes/prefixes, dictionary or thesaurus entries for the words, etc.

The module can also determine an image similarity score representing the similarity between images in the candidate and authentic pages. This scoring can be in response to the name similarity score being above a first similarity threshold, but can also be independent of that. In one embodiment, the pairing module 330 generates a hash value of the image of the candidate page and a hash value of the image of the authenticated page. The paring module 330 determines the image similarity score based on a comparison of the two hash values. In another embodiment, the pairing module 330 determines semantic similarity between the images in the candidate and authentic pages. For example, the paring module 330 generates a semantic hashing code for each of the images and compares the sematic hash codes to determine the semantic similarity. A semantic hashing code of an image can be a compact binary code generated based on visual features extracted from the image. Visual features include facial features, hair, clothes, logos, trademarks, country flags, and so on.

Further, the pairing module 330 can determine the overall similarity score based on the name similarity score, the image similarity score, or any combination of the two. There may also be more than one name or image similarity score for different key terms associated with the pages, for different images shown on the pages, etc. In addition, other features of the pages can be compared and scored, such as content in various posts displayed on the pages (e.g., text of the post, images of the post, likes or shares of the post by other users and which users, comments by other users on the post and which particular users), content in profiles of entities that operate the pages, etc. In some embodiments, the overall similarity score equals the image similarity score or the name similarity score. In some other embodiments, the similarity score is an aggregation of the name similarity score and the image similarity score, or these scores plus any other scores calculated for the pages. For example, the similarity score (5) is a weighted sum of the name similarity score (NS) and the image similarity score (IS). Expressed as a formula this equates to:

$$S = W_{NS} \times NS + W_{IS} \times IS.$$

where $W_{NS}$ is the weight of the name similarity score and $W_{IS}$ is the weight of the image similarity score.

Once the pages are paired up based on the similarity scoring process, the detecting module 370 determines an imposter score of each candidate page in the pair. The imposter score indicates a likelihood that the candidate page is an imposter page. The detecting module 370 uses the imposter detection model 350 trained by the machine learning module 340 to determine the imposter score. The machine learning module 340 applies machine learning techniques to train the imposter detection model 350. When applied to a pair of candidate page and authenticated page, the imposter detection model 350 outputs an imposter score indicating a likelihood that the candidate page is an imposter page, i.e., whether the candidate page is intended for deceiving viewers that it is an authentic page of an individual or entity of the authenticated page. In one embodiment, the imposter score output from the imposter detection model 350 is a percentage from 0% to 100%. The output from the imposter detection model 350 can be in other forms.

As part of the training of the imposter detection model 350, the machine learning module 340 forms a training set. In some embodiments, the training set includes a positive training set of pairs of authenticated pages and unauthenticated pages that have been determined to be imposter pages and a negative training set of pairs of authenticated pages and unauthenticated pages that have been determined not to be imposter pages.

The machine learning module 340 extracts features from each pair in the training set, the features being variables deemed potentially relevant to whether or not the unauthenticated page is intended for deceiving viewers that it is an authentic page of an individual or entity of the authenticated page. Specifically, the features extracted by the machine learning module 340 include features associated with both explicit and implicit characteristics of the pages. Explicit characteristics can be information included in the pages. Example explicit characteristics include names, images, videos, descriptions, etc. Implicit characteristics can be indicated in actions performed by viewers with the pages, such as comments made by viewers that indicate authenticity of the pages. The explicit and implicit characteristics can be retrieved from the user profile store 205 and the action log 220, respectively.

The machine learning module 340 uses machine learning to train the imposter detection model 350, with the features of the positive training set and in some embodiments, the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments.

In some embodiments, the machine learning module 340 uses the pair of each candidate page and the corresponding authenticated pages and the imposter scores of the candidate pages to continuously train the imposter detection model 350. These can all be fed back into the model along with an indication of the accuracy of the prediction such that the model learns from each new output.

In some embodiments, a validation set is formed of additional pairs of authenticated pages and unauthenticated pages, other than those in the training sets, the unauthenticated pages of which have already been determined to be imposter pages or not. The machine learning module 340 applies the trained validation model to the validation set to quantify the accuracy of the imposter detection model 350. Common metrics applied in accuracy measurement include: Precision=TP/(TP+FP) and Recall=TP/(TP+FN), where precision is how many outcomes the imposter detection model 350 correctly determined (TP or true positives) out of the total it determined (TP+FP or false positives), and recall is how many outcomes the imposter detection model 350 correctly determined (TP) out of the total number of unauthenticated pages that were falsely determined as imposter pages (TP+FN or false negatives). The F score (F-score=2*PR/(P+R)) unifies precision and recall into a single measure. In one embodiment, the machine learning module 340 iteratively re-trains the imposter detection model 350 until the occurrence of a stopping condition, such as the accuracy measurement indication that the model is sufficiently accurate, or a number of training rounds having taken place.

The detecting module 370 compares the imposter score with an imposter score threshold. In response to the imposter score being beyond the imposter score threshold, the detecting module 370 prevents the candidate page form being provided for display to online system users. The detecting module 370 can mark the candidate page as having a high likelihood of being an imposter page in the user profile store 205. Alternatively, the detecting module 370 can remove the candidate page from the user profile store 205.

In some embodiments, the detecting module 370 forwards the candidate page, through the interface module 310, to another entity for secondary review. For example, the detecting module 370 sends the candidate page to a client device associated with a privileged or review user of the online system 140. The privileged user determines whether the candidate page is an imposter page. Upon receiving a determination that the candidate page is an imposter page, the detecting module 370 can block the user account associated with the candidate page. The detecting module 370 may also remove other pages or content created by the user account from the online system 140.

Figure 4:
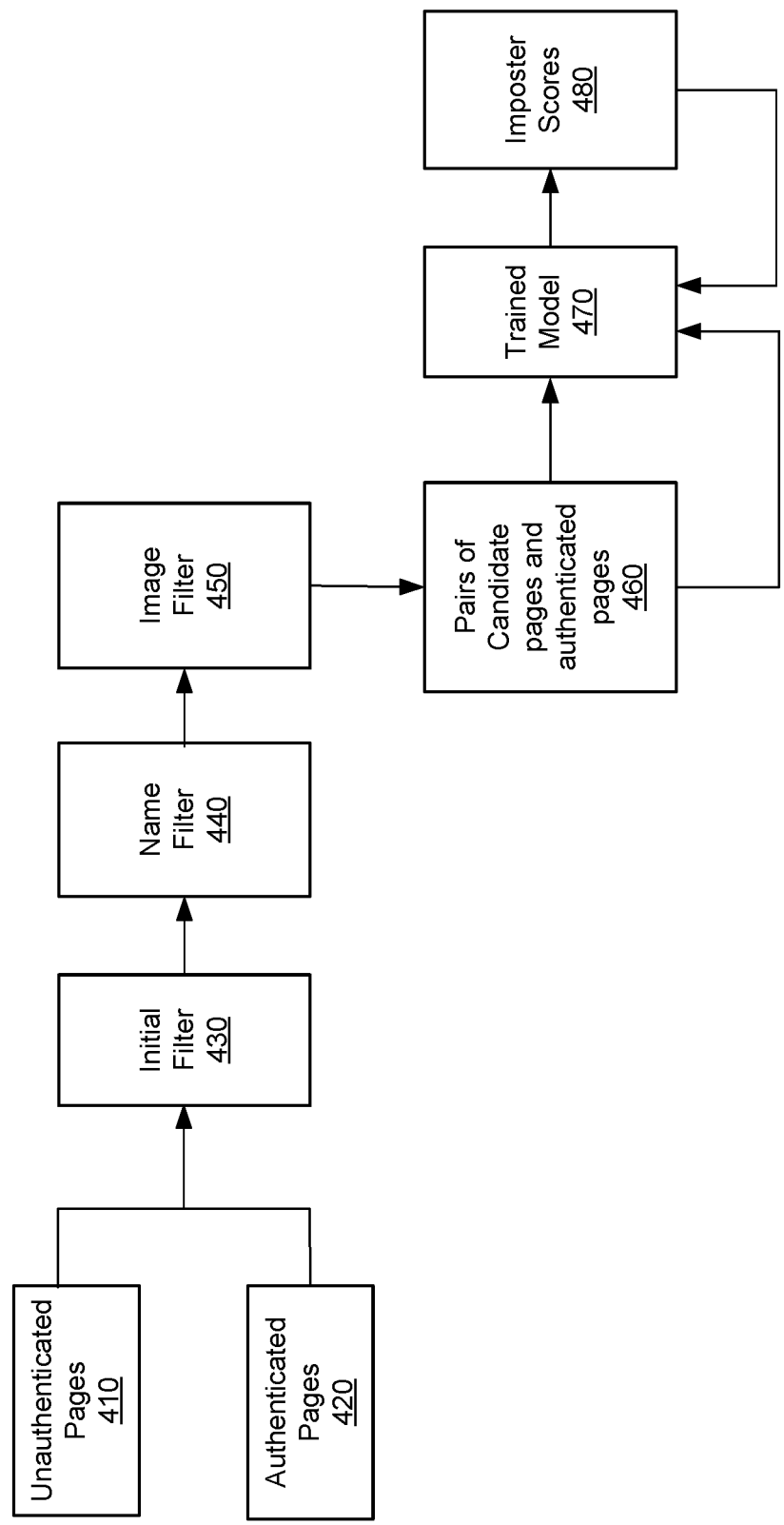
FIG. 4 illustrates an example workflow of the imposter detection module, in accordance with an embodiment.

FIG. 4 shows an example workflow of the imposter detection module 230, in accordance with an embodiment. The imposter detection module 230 inputs unauthenticated pages 410 and authenticated pages 420 into an initial filter 430 to obtain a group of candidate pages. An embodiment of the initial filter 430 is the initial filter 320 discussed above in conjunction with FIG. 3.

Further, the imposter detection module 230 inputs the candidate pages and authenticated pages into a name filter 440 and an image filter 450 to pair each candidate page up with an authenticated page. The combination of the name filter and image filter is an embodiment of the paring engine 330 discussed above in conjunction with FIG. 3. For each candidate page, the name filter 440 filters the names of the authenticated pages and cluster the candidate page with a group of authenticated pages that have similar names. For example, the name filter 440 compares the pronunciation or spelling of the name of the candidate page and the name of each authenticated pages and determine a similarity score indicating similarity between the name of the candidate page and the name of each authenticated pages. The group of authenticated pages have similarity scores beyond a first similarity threshold.

Figure 5:
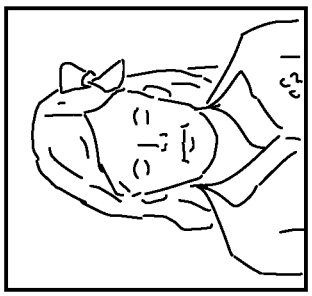
FIG. 5 shows examples of an authenticated page and two unauthenticated pages, in accordance with an embodiment.
Figure 5:
Figure 5:

FIG. 5 shows an unauthenticated page 510 and two authenticated pages 520 and 530 that are clustered with the unauthenticated page 510, in accordance with an embodiment. The unauthenticated page 510 is a candidate page considered as a possible imposter page and has a name ">_<Jen Doe>_<". The authenticated page 520 has a name "Jenna Doe," which might represent a particular celebrity. The authenticated page 530 has a name "Jen Doe," which might represent a fan page of Jenna Doe that is using a short name for the celebrity. The name filter 440 determines that the pronunciation of the names of the authenticated pages 520 and 530 is similar to that of the unauthenticated page 510, and possibly that other factors are similar, such as spelling of the two and name origin. Accordingly, the name filter 440 clusters the authenticated pages 520 and 530 with the unauthenticated page 510.

In the embodiment of FIG. 5, the unauthenticated page 510 is clustered with two authenticated pages 520 and 530. But in another embodiment, an unauthenticated page can be clustered with a larger number of authenticated pages, e.g., hundreds, thousands, etc. In yet another embodiment, the name filter 440 may determine that, compared with "Jenna Doe," "Jen Doe" is more similar to ">_<Jen Doe>_<" and therefore, choose the authenticated page 530 to cluster with the unauthenticated pages 510. The term ">_<Jen Doe>_<" includes the name "Jen Doe" plus symbols before and after "Jen Doe." It is likely that ">_<Jen Doe>_<" is used to deceive users into believing that the unauthenticated page 510 is a page of "Jen Doe."

Returning to FIG. 4, the imposter detection module 230 inputs the candidate page and the one or more authenticated pages into the image filter 450. The image filter 450 indexes the images of the candidate page and the authenticated pages. For example, the image filter 450 extracts visual features from each of the images and generates a semantic hashing code for each of the images based on the extracted visual feature. By comparing the semantic hashing codes of the candidate page with that of each of the group of authenticated pages, the image filter 450 identifies one of the authenticated pages for pairing up with the candidate page.

Taking the unauthenticated page 510 and authenticated pages 520 and 530 in FIG. 5 for example, the image filter 450 generates a semantic hashing code for each of the three pages based on visual features included in the images of the pages, including faces, clothes, background, hair, and hair accessory. By comparing the semantic hashing code, the image filter 450 determines that compared with the image of the authenticated page 520, the image of the authenticated page 530 is more similar to the image of the unauthenticated page 510. Accordingly, the image similarity score of the authenticated page 530 is higher than that of the authenticated page 520. The image filter 450 pairs the unauthenticated page 510 with the authenticated page 530.

Returning back to FIG. 4, the imposter detection module 230 inputs the pairs 460 of candidate pages and authenticated pages into a trained model 470. The trained model 470 outputs imposter scores 480, each of which indicate a likelihood of a candidate page being an imposter page. The pairs 460 of candidate pages and authenticated pages and the imposter scores 480 are used as training date to continuously train the trained model 470.

The method thus allows the online system 140 to operate more efficiently in detecting imposter pages requested by users to be presented by the online system 140. In the embodiment in which the online system 140 is a social networking system, it manages a complicated social graph or web of many millions of pages. The system needs an efficient way to determine which pages are intended for deceiving users and utilizes this rich database of information to accurately identify these imposter pages and take actions on them. The trained model 470 described here allows the system to operate more efficiently in mining this complex web of online information to quickly detect imposter pages in way that prior systems were not able to do.

FIG. 6 is a flowchart illustrating a process 600 of detecting imposter pages, in accordance with an embodiment. In some embodiments, the process 600 is performed by the imposter detection module 230, although some or all of the operations in the method may be performed by other entities in other embodiments. In some embodiments, the operations in the flow chart are performed in a different order and can include different and/or additional steps.

The imposter detection module 230 retrieves 610 authenticated pages, for example, from the user profile store 205. The authenticated pages have been determined not to be imposter pages. Each authenticated page is associated with a name and an image. The imposter detection module 230 also retrieves 620 unauthenticated pages. The unauthenticated pages are possible imposter pages. Each unauthenticated page associated with a name and an image.

The imposter detection module 230 identifies 630 one or more unauthenticated pages to be legitimate pages relating to one of the authenticated pages. The name of each of the identified unauthenticated pages is associated with the name of an authenticated page. For example, the name of an identified unauthenticated page includes the name of the authenticated page followed by the word "fan." The imposter detection module 230 filters 640 the identified one or more unauthenticated pages out from the retrieved unauthenticated pages to obtain a plurality of candidate pages.

Further, the imposter detection module 230 pairs up 650 each of the candidate pages up with an authenticated page. In some embodiments, the imposter detection module 230 determines a similarity score indicating similarity of the candidate page to each of a plurality of the retrieved authenticated pages based on names and images of the candidate page and the authenticated page. The imposter detection module 230 selects the authenticated page to pair up with the candidate page based on the similarity scores of the plurality of the retrieved authenticated pages. For example, the imposter detection module 230 ranks the similarity scores. The selected authenticated page has the highest similarity score.

The imposter detection module 230 provides 660 each pair of a candidate page and the corresponding authenticated page to a trained model. The trained model is configured to provide an imposter score indicating likelihood that the candidate page is an imposter page. Responsive to the imposter score of a candidate page being above an imposter score threshold, the imposter detection module 230 prevents 670 the candidate page from being provided for display to users of the online system.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   retrieving, by an online system, authenticated pages that have been determined not to be imposter pages, each authenticated page associated with a name and an image;
   retrieving, by the online system, unauthenticated pages as possible imposter pages, each unauthenticated page associated with a name and an image;
   identifying one or more of the unauthenticated pages to be legitimate pages relating to one of the authenticated pages;
   filtering the identified unauthenticated pages out from the retrieved unauthenticated pages such that the unauthenticated pages remaining are candidate pages for analysis as possible imposter pages;
   pairing up each of the candidate pages with an authenticated page by:
      determining a similarity score indicating similarity of the candidate page to each of the authenticated pages based on names and images of the candidate page and the authenticated page, and
      selecting one of the authenticated pages to pair up with the candidate page based on the similarity scores;
   providing each pair to a trained model configured to provide an imposter score indicating likelihood that the candidate page is an imposter page, the model trained to determine imposter scores based on a set of training data;
   responsive to the imposter score of a candidate page being above an imposter score threshold, preventing the candidate page from being provided for display to users of the online system;
   training the model by inputting the candidate page having the imposter score above the imposter score threshold and the authenticated page paired with the candidate page back into the model as new training data, the model trained over time by inputting additional pairs of candidate pages and authenticated pages; and
   responsive to the imposter score of the candidate page being above a secondary imposter score threshold, transmitting the candidate page to a client device associated with a privileged user of the online system for determining whether the candidate page is an imposter page.

2. The method of claim 1, wherein selecting one of the authenticated pages to pair up with the candidate page based on the similarity scores comprises:
   ranking the similarity scores; and
   selecting an authenticated page having a highest similarity score.

3. The method of claim 1, wherein determining a similarity score indicating similarity of the candidate page to each of the authenticated pages comprises:

determining a name similarity score that indicates similarity between the name of the candidate page and the name of the authenticated page;

responsive to the name similarity score being above a first similarity threshold, determining an image similarity score that indicates similarity between the image of the candidate page and the image of the authenticated page; and determining the similarity score based on at least one of the following: the name similarity score, the image similarity score, or any combination thereof.

4. The method of claim 3, wherein determining a name similarity score comprises:

comparing pronunciation of the name of the candidate page and the name of the authenticated page; and determining the name similarity score based on the comparison.

5. The method of claim 3, wherein determining an image similarity score comprises:

generating a first hash value of the image of the candidate page;

generating a second hash value of the image of the authenticated page; and determining the image similarity score by comparing the first hash value with the second hash value.

6. The method of claim 3, wherein determining an image similarity score comprises:

generating a first semantic hashing code for the image of the candidate page;

generating a second semantic hashing code for the image of the authenticated page;

determining semantic similarity of the image of the candidate page and the image of the authenticated page based on the first semantic hashing code and second semantic hashing code; and determining the image similarity score based on the determined semantic similarity.

7. The method of claim 1, further comprising:

receiving, from the client device associated with the privileged user, a determination that the candidate page is an imposter page; and based on the determination, blocking a user account associated with the candidate page.

8. A method comprising:

retrieving, by an online system, an unauthenticated page as a possible imposter page, the unauthenticated page associated with a name and an image;

retrieving, by an online system, a plurality of authenticated pages that have been determined not to be imposter pages, each authenticated page associated with a name and an image;

pairing up the unauthenticated page with an authenticated page by:

determining a similarity score indicating similarity of the unauthenticated page to each of the authenticated pages based on names and images of the candidate page and the authenticated page, and selecting one of the authenticated pages based on the similarity scores;

providing each pair to a trained model configured to provide an imposter score indicating likelihood that the candidate page is an imposter page, the model trained to determine imposter scores based on a set of training data;

responsive to the imposter score of a candidate page being above an imposter score threshold, preventing the candidate page from being provided for display to users of the online system;

training the model by inputting the candidate page having the imposter score above the imposter score threshold and the authenticated page paired with the candidate page back into the model as new training data, the model trained over time by inputting additional pairs of candidate pages and authenticated pages; and responsive to the imposter score of the candidate page being above a secondary imposter score threshold, transmitting the candidate page to a client device associated with a privileged user of the online system for determining whether the candidate page is an imposter page.

9. The method of claim 8, wherein selecting one of the authenticated pages based on the similarity scores comprises:

ranking the similarity scores; and selecting an authenticated page having a highest similarity score.

10. The method of claim 8, wherein determining a similarity score indicating similarity of the unauthenticated page to each of the authenticated pages comprises:

determining a name similarity score that indicates similarity between the name of the unauthenticated page and the name of the authenticated page;

responsive to the name similarity score being above a first similarity threshold, determining an image similarity score that indicates similarity between the image of the unauthenticated page and the image of the authenticated page; and determining the similarity score based on at least one of the following: the name similarity score, the image similarity score, or any combination thereof.

11. The method of claim 8, further comprising:

receiving, from the client device associated with the privileged user, a determination that the unauthenticated page is an imposter page; and based on the determination, blocking a user account associated with the unauthenticated page.

12. A non-transitory computer readable medium storing executable computer program instructions, the computer program instructions comprising instructions that when executed cause a computer processor to:

retrieve, by an online system, authenticated pages that have been determined not to be imposter pages, each authenticated page associated with a name and an image;

retrieve, by the online system, unauthenticated pages as possible imposter pages, each unauthenticated page associated with a name and an image;

identify one or more of the unauthenticated pages to be legitimate pages relating to one of the authenticated pages;

filter the identified unauthenticated pages out from the retrieved unauthenticated pages such that the unauthenticated pages remaining are candidate pages for analysis as possible imposter pages;

pair up each of the candidate pages with an authenticated page by:

determining a similarity score indicating similarity of the candidate page to each of the authenticated pages based on names and images of the candidate page and the authenticated page, and selecting one of the authenticated pages to pair up with the candidate page based on the similarity scores;

provide each pair to a trained model configured to provide an imposter score indicating likelihood that the candidate page is an imposter page, the model trained to determine imposter scores based on a set of training data;

responsive to the imposter score of a candidate page being above an imposter score threshold, prevent the candidate page from being provided for display to users of the online system;

train the model by inputting the candidate page having the imposter score above the imposter score threshold and the authenticated page paired with the candidate page back into the model as new training data, the model trained over time by inputting additional pairs of candidate pages and authenticated pages; and responsive to the imposter score of the candidate page being above a secondary imposter score threshold, transmit the candidate page to a client device associated with a privileged user of the online system for determining whether the candidate page is an imposter page.

13. The non-transitory computer readable medium of claim 12, wherein the computer program instructions for selecting one of the authenticated pages to pair up with the candidate page based on the similarity scores comprise instructions that when executed cause the computer processor to:

rank the similarity scores; and select an authenticated page having a highest similarity score.

14. The non-transitory computer readable medium of claim 12, wherein the computer program instructions for determining a similarity score indicating similarity of the candidate page to each of the authenticated pages comprise instructions that when executed cause the computer processor to:

determine a name similarity score that indicates similarity between the name of the candidate page and the name of the authenticated page;

responsive to the name similarity score being above a first similarity threshold, determine an image similarity score that indicates similarity between the image of the candidate page and the image of the authenticated page; and determine the similarity score based on at least one of the following: the name similarity score, the image similarity score, or any combination thereof.

15. A non-transitory computer readable medium storing executable computer program instructions, the computer program instructions comprising instructions that when executed cause a computer processor to:

retrieve, by an online system, an unauthenticated page as a possible imposter page, the unauthenticated page associated with a name and an image;

retrieve, by an online system, a plurality of authenticated pages that have been determined not to be imposter pages, each authenticated page associated with a name and an image;

pair up the unauthenticated page with an authenticated page by:

determining a similarity score indicating similarity of the unauthenticated page to each of the authenticated pages based on names and images of the candidate page and the authenticated page, and selecting one of the authenticated pages based on the similarity scores;

provide each pair to a trained model configured to provide an imposter score indicating likelihood that the candidate page is an imposter page, the model trained to determine imposter scores based on a set of training data;

responsive to the imposter score of a candidate page being above an imposter score threshold, prevent the candidate page from being provided for display to users of the online system;

train the model by inputting the candidate page having the imposter score above the imposter score threshold and the authenticated page paired with the candidate page back into the model as new training data, the model trained over time by inputting additional pairs of candidate pages and authenticated pages; and responsive to the imposter score of the candidate page being above a secondary imposter score threshold, transmit the candidate page to a client device associated with a privileged user of the online system for determining whether the candidate page is an imposter page.

16. The non-transitory computer readable medium of claim 15, wherein the computer program instructions for determining a similarity score indicating similarity of the unauthenticated page to each of the authenticated pages comprise instructions that when executed cause the computer processor to:

determine a name similarity score that indicates similarity between the name of the unauthenticated page and the name of the authenticated page;

responsive to the name similarity score being above a first similarity threshold, determine an image similarity score that indicates similarity between the image of the unauthenticated page and the image of the authenticated page; and determine the similarity score based on at least one of the following: the name similarity score, the image similarity score, or any combination thereof.

* * * * *